US008027975B2

(12) United States Patent
Gabriel et al.

(10) Patent No.: US 8,027,975 B2
(45) Date of Patent: Sep. 27, 2011

(54) IDENTIFYING AND CHANGING PERSONAL INFORMATION

(75) Inventors: Raefer Gabriel, New York, NY (US); Brian Kelley, Chicago, IL (US); James Aubry, Chicago, IL (US); David Thompson, Pasadena, CA (US); Michael Fertik, Louisville, KY (US)

(73) Assignee: Reputation.com, Inc., Redwood City, CA (US)

( * ) Notice: Subject to any disclaimer, the term of this patent is extended or adjusted under 35 U.S.C. 154(b) by 393 days.

(21) Appl. No.: 12/021,978

(22) Filed: Jan. 29, 2008

(65) Prior Publication Data

US 2008/0183700 A1 Jul. 31, 2008

Related U.S. Application Data

(60) Provisional application No. 60/898,899, filed on Jan. 31, 2007.

(51) Int. Cl.
*G06F 7/00* (2006.01)
*G06F 17/30* (2006.01)

(52) U.S. Cl. ........................................ 707/731; 707/734
(58) Field of Classification Search ........................ None
See application file for complete search history.

(56) References Cited

U.S. PATENT DOCUMENTS

| 5,873,081 | A * | 2/1999 | Harel | 1/1 |
|---|---|---|---|---|
| 5,987,457 | A * | 11/1999 | Ballard | 1/1 |
| 6,178,419 | B1 * | 1/2001 | Legh-Smith et al. | 1/1 |
| 6,182,066 | B1 * | 1/2001 | Marques | 1/1 |
| 6,510,432 | B1 * | 1/2003 | Doyle | 1/1 |
| 6,532,459 | B1 * | 3/2003 | Berson | 1/1 |
| 7,076,558 | B1 * | 7/2006 | Dunn | 709/229 |
| 7,117,207 | B1 * | 10/2006 | Kerschberg et al. | 1/1 |
| 2002/0174230 | A1 * | 11/2002 | Gudorf et al. | 709/227 |
| 2002/0178381 | A1 * | 11/2002 | Lee et al. | 713/201 |
| 2003/0093260 | A1 * | 5/2003 | Dagtas et al. | 704/1 |
| 2003/0135725 | A1 * | 7/2003 | Schirmer et al. | 712/300 |
| 2004/0019584 | A1 * | 1/2004 | Greening et al. | 707/1 |
| 2004/0082839 | A1 * | 4/2004 | Haugen | 600/300 |
| 2004/0169678 | A1 * | 9/2004 | Oliver | 345/738 |
| 2004/0267717 | A1 * | 12/2004 | Slackman | 707/3 |

(Continued)

OTHER PUBLICATIONS

Ontology based Personlized Search, Pretschner et al, Proc. 11th IEEE International Conference on Tools with Artificial Intelligence, pp. 391-398, Chicago, Nov. 1999.*

(Continued)

*Primary Examiner* — Pierre Vital
*Assistant Examiner* — Augustine Obisesan
(74) *Attorney, Agent, or Firm* — Finnegan, Henderson, Farabow, Garrett & Dunner LLP

(57) ABSTRACT

Systems, apparatuses, and methods for analyzing information about a user are presented which include obtaining at least one search result based on at least one search terms describing the user; presenting the at least one search result to the user; receiving an indication from the user of the desirability of a search result; and performing an action based on the desirability of the search result. Systems, apparatuses, and methods are also presented for determining a reputation score representing the reputation of a user which include collecting search results from data source, determining an effect on the reputation of the user of the search results from the data source, and calculating a reputation score for the user based on the determined effect on the reputation of the user from the search results from the data source.

24 Claims, 6 Drawing Sheets

U.S. PATENT DOCUMENTS

| | | | |
|---|---|---|---|
| 2005/0005168 A1* | 1/2005 | Dick | 713/201 |
| 2005/0160062 A1* | 7/2005 | Howard et al. | 707/1 |
| 2005/0234877 A1* | 10/2005 | Yu | 707/3 |
| 2005/0256866 A1* | 11/2005 | Lu et al. | 707/5 |
| 2006/0004716 A1* | 1/2006 | Hurst-Hiller et al. | 707/3 |
| 2006/0042483 A1* | 3/2006 | Work et al. | 101/91 |
| 2006/0116896 A1* | 6/2006 | Fowler et al. | 705/1 |
| 2006/0152504 A1* | 7/2006 | Levy | 345/419 |
| 2006/0161524 A1* | 7/2006 | Roy et al. | 707/3 |
| 2006/0253423 A1* | 11/2006 | McLane et al. | 707/2 |
| 2006/0253580 A1* | 11/2006 | Dixon et al. | 709/225 |
| 2006/0253583 A1* | 11/2006 | Dixon et al. | 709/225 |
| 2006/0271524 A1* | 11/2006 | Tanne et al. | 707/3 |
| 2006/0294086 A1* | 12/2006 | Rose et al. | 707/3 |
| 2007/0073660 A1* | 3/2007 | Quinlan | 707/3 |
| 2007/0101419 A1* | 5/2007 | Dawson | 726/9 |
| 2008/0021890 A1* | 1/2008 | Adelman et al. | 707/3 |
| 2008/0082687 A1* | 4/2008 | Cradick et al. | 709/246 |

OTHER PUBLICATIONS

Adaptive Web Search based on User Profile Constructed without any Effort from Users, Sugiyama et al, ACM, May 17-22, 2004.*

Personalized Web Search by Mapping User Queries to Categories, Liu et al, CIKM,'02, Nov. 4-9, 2002.*

Filtering web pages for quality indicators: An Empirical Approach to finding high quality of consumer health information on the world wide web, Price et al, AMIA, 1999.*

An Introduction of the Literature on Online Reputation Systems for the MMAPPS project, Howison et al, Aug. 18, 2003.*

* cited by examiner

IDENTIFYING AND CHANGING PERSONAL INFORMATION

RELATED APPLICATIONS

This application claims the benefit of priority to U.S. Provisional Application No. 60/898,899, filed Jan. 31, 2007, titled "Identifying and Correcting Personal Information," which is herein incorporated by reference in its entirety.

FIELD OF DISCLOSURE

The present inventions relate to methods, systems, and apparatuses for facilitating the identification of personal information, the changing and/or removal of such information, and the generation of subjective personal reputation scoring or rating based on the information identified.

BACKGROUND

Since the early 1990s, the number of people using the World Wide Web and the Internet has grown at a substantial rate. As more users take advantage of the services available on the Internet by registering on websites, posting comments and information electronically, or simply interacting with companies that post information about others (such as online newspapers or social networking websites), more and more information about users is publicly available online. Naturally, individuals, organizations, and companies such as professionals, parents, college applicants, job applicants, employers, charities and corporations have raised serious and legitimate concerns about coping with the ever-increasing amount of information about them available on the Internet, because online content about even the most casual Internet users can be harmful, hurtful, or even false.

The process of evaluating a user in a variety of professional and/or personal contexts has become increasingly sensitive to the type and quantity of information available about that user on the Internet. A user may desire an easy way to assess whether she, or somebody she is interacting with, has accrued a reputation that is generally positive or negative or positive or negative with regard to a certain aspect of their reputation. Exemplary interactions of a user with another include, for example, beginning a romantic relationship, offering an employment or business opportunity, or engaging in a financial transaction. As the amount of information about a user available online increases, the process of sifting through all of that information, assessing its relative import, classifying it, and synthesizing it down to a general assessment of the user's public, online, reputation becomes more daunting.

Therefore, there is a need for methods, apparatuses, and systems that will allow parties to continue using the Internet while ensuring that the information about them on the Internet is not incorrect, slanderous, scandalous, or otherwise harmful to their reputations or well-being. There is also a need for systems that will allow parties to understand rapidly and broadly how their reputations may be perceived by other individuals, groups, organizations, and/or companies, based on the information available about them on the Internet.

SUMMARY

Presented are systems, apparatuses, and methods for analyzing information about a user are presented which include obtaining at least one search result from a data source based on at least one search term describing the user, receiving an indication of the desirability of the at least one search result, and performing an action based on the desirability of the at least one search result.

Systems, apparatuses, and methods are also presented for determining a reputation score representing the reputation of a user which include collecting at least one search result from a data source determining an effect on the reputation of the user of the at least one search result from the data source and calculating a reputation score for the user based on the determined effect on the reputation of the user from the at least one search result from the data source.

Also presented are systems, apparatuses, and methods for analyzing information about a user that include obtaining at least one search result based on at least one search term describing the user, determining relevancy of the at least one search result presenting the at least one search result to the user, receiving an indication from the user of the relevance or desirability of a search result of the at least one search result, and performing an action based on the desirability of the search result.

In some embodiments, the systems, apparatuses, and methods may also include determining an additional search term based on the at least one search result, and using the additional search term to obtain a search result. Determining an additional search term may be performed automatically and/or may be performed by a human agent or the user.

In some embodiments, an indication may be received that a search result may be an undesirable search result. The action performed may be causing the removal or change of the undesirable search result at a data source from which the undesirable search result was obtained. The undesirable search result may contain data about the user that may be incorrect or may be damaging to the reputation of the user. The action performed may include determining whether the undesirable search result can be changed or removed at a data source from which the undesirable search result was obtained and, if the undesirable search result can be changed or removed at the data source, causing the change, correction, or removal of the undesirable search result at the data source.

In some embodiments, determining relevancy of the at least one search result may include determining whether the at least one search result contains information associated with the user and/or ignoring a search result if the search result does not contain information associated with the user. In some embodiments, if the at least one search result does not contain information associated with the user, then an exclusionary search term may be added in a subsequent search, wherein the exclusionary search term may be designed to exclude the at least one search result does not contain information associated with the user.

In some embodiments, obtaining at least one search result may be performed multiple times and additional steps may be performed, such as generating a search ranking system based on the at least one search result from the multiple performances of the obtaining step and sorting a further search result based on the search ranking system. Generating a search ranking system may be performed using a Bayesian network. The Bayesian network may utilize a corpus of irrelevance-indicating tokens and a corpus of relevance-indicating tokens.

In some embodiments, the at least one search result may be obtained periodically. Periodicity of performing the obtaining step may be determined based on user characteristics or data source characteristics.

In some embodiments, obtaining at least one search result may be performed multiple times and additional steps may be performed, such as determining a signature for a currently-obtained search result, comparing the signature to a previously-obtained signature for a previously-obtained search result, and determining the relevancy for the search result when the currently-obtained signature and the previously-obtained signature are different.

In some embodiments, determining relevancy may include presenting the at least one search result to a human agent obtaining an indication of a categorization of the at least one search result from the human agent, and automatically categorizing the at least one search result based on the indication from the human agent.

In some embodiments, obtaining the at least one search result may include receiving at least one search result from, for example, a human agent or user and determining its relevancy. Determining the relevancy of the search result may include obtaining an indication of a categorization of the at least one search result from, for example, the human agent or user, and automatically categorizing the at least one search result based on the indication from, for example, the human agent or user.

Systems, methods, and apparatuses are also presented that determine the reputation of a user by collecting data from a data source, determining the effect on reputation of the user of the data from the data source, and determining a reputation score for the user based on the effect on reputation of the data from the data source. In some embodiments, the systems, methods, and apparatuses may further include presenting the reputation score to a third party at the user's request in order to vouch that the user is as reputable as the score indicates, presenting the reputation score to a third party at the third party's request in order to vouch that the user may be as reputable as the score indicates wherein the data source includes, for example, a credit agency database, a criminal database, an insurance database, a social networking database, and/or a news database.

In some embodiments, determining the effect on reputation may include categorizing an element of the at least one search result according to its mood and/or significance, and basing the effect on reputation on the mood and/or significance categorization(s). In some embodiments, determining the effect on reputation may include associating an element of the at least one search result along a positive to negative scale, and basing the effect on reputation on the positive to negative associations.

In some embodiments, determining a reputation score for a user may comprise determining at least one reputation sub-score for the user based on the effect on reputation of the search result from the data source. Types of reputation sub-score may include any appropriate reputational attribute, for example, a reputation as an employee, employer, significant other, lawyer, or reputation as a potential parent.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

DESCRIPTION OF EXEMPLARY EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

Figure 1:
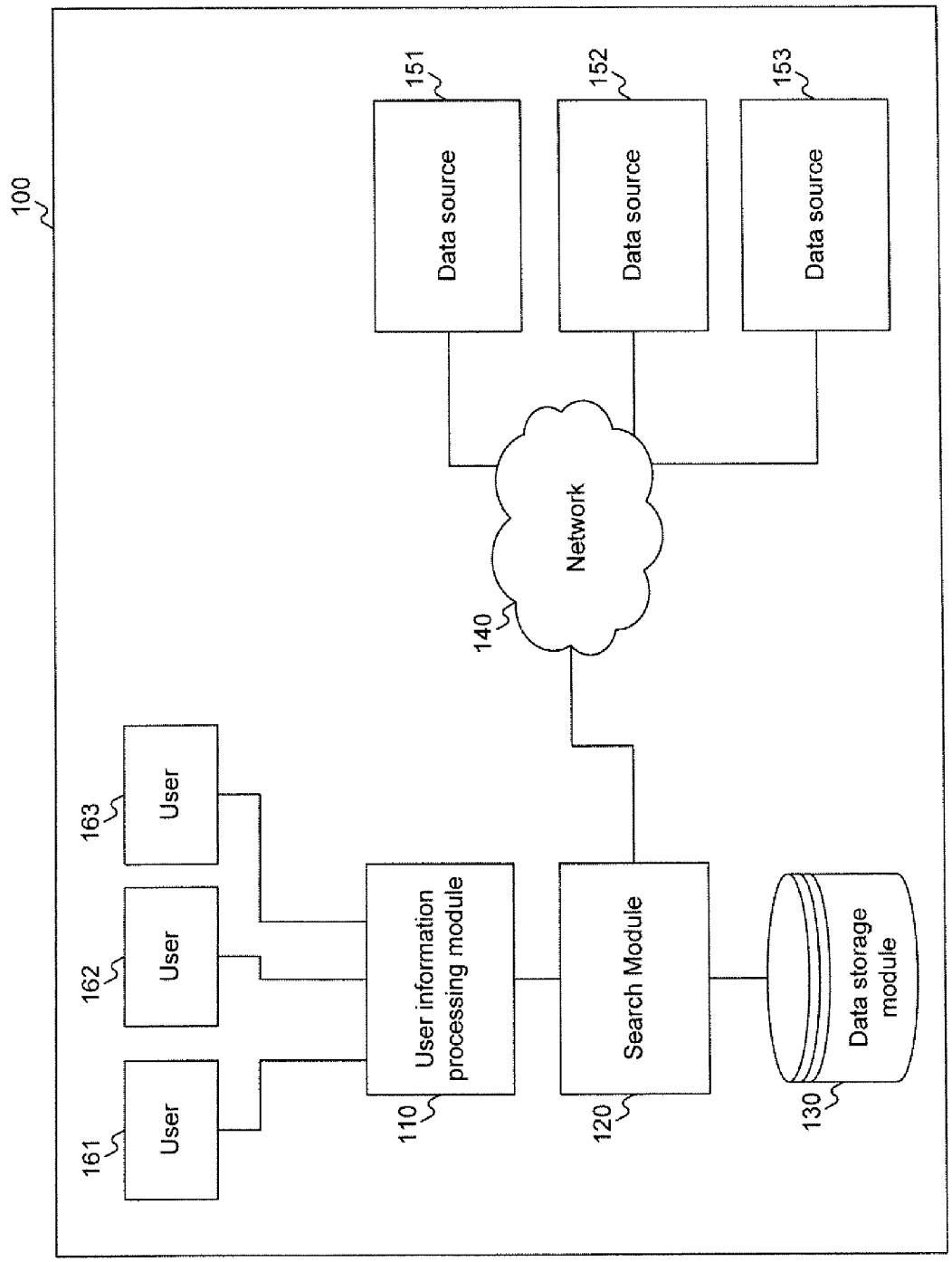
FIG. 1 is a block diagram depicting an exemplary system for analyzing information about a user.

FIG. 1 is a block diagram depicting an exemplary system 100 for analyzing information about a user. In example system 100, search module 120 is coupled to user information processing module 110, data storage module 130, and network 140. Search module 120 is also coupled to at least one data source, such as data sources 151, 152, and/or 153, either via network 140 or via other coupling (not pictured). Data sources 151, 152, and/or 153, may be proprietary databases containing information about one or more users 161, 162, and/or 163. Exemplary data sources 151, 152, and/or 153 may be, for example, "blogs," or websites, such as social networking websites, news agency websites, private party websites, or company websites. Exemplary data sources 151, 152, and/or 153 may also be cached information stored in a search database, such as those maintained by Google™ or Yahoo!™. Exemplary data sources 151, 152, and 153 may further be, for example, criminal databases or listings, credit agency data sources, insurance databases, or any electronic or other source of information about user 161, 162, and/or 163. System 100 may include any number of data sources 151, 152, and/or 153 and may be used by any number of users, human agents and/or third parties.

One or more users 161, 162, and/or 163 may interact with user information processing module 110 through, for example, personal computers, personal data devices, telephones, or other devices coupled to the user information processing module 110 via network 140 (not pictured), or via other coupling through which they may interact with information processing module 110.

One or more users 161, 162, and/or 163 may directly or indirectly provide user information processing module 110 with information or search terms that identify a user. User information processing module 110 or search module 120 may use the identifying information or search terms to construct searches to find information, or search results, about a user. The search module 120 then may search a data source 151, 152, and/or 153, using at least one search term, for information about a user. A search result about a user may be stored in data storage module 130 and/or analyzed by user information processing module 110. Specific embodiments of analyzing and storing data about a user are described with respect to FIGS. 2, 3, 4, 5, and 6.

Network 140 may be, for example, the Internet, an intranet, a local area network, a wide area network, a campus area network, a metropolitan area network, an extranet, a private extranet, any set of two or more coupled electronic devices, or a combination of any of these or other appropriate networks.

The coupling between modules, or between modules and network 140, may include, but is not limited to, electronic connections, coaxial cables, copper wire, and fiber optics, including the wires that comprise network 140. The coupling may also take the form of acoustic or light waves, such as lasers and those generated during radio-wave and infra-red data communications. Coupling may also be accomplished by communicating control information or data through one or more networks to other data devices.

Each of the logical or functional modules described above may comprise multiple modules. The modules may be implemented individually or their functions may be combined with the functions of other modules. Further, each of the modules may be implemented on individual components, or the modules may be implemented as a combination of components. For example, user information processing module 110, search module 120, and data storage module 130 may each be implemented by a field-programmable gate array (FPGA), an application-specific integrated circuit (ASIC), a complex programmable logic device (CPLD), a printed circuit board (PCB), a combination of programmable logic components and programmable interconnects, single CPU chip, a CPU chip combined on a motherboard, a general purpose computer, or any other combination of devices or modules capable of performing the tasks of modules 110, 120, and/or 130. Data storage module 130 may comprise a random access memory (RAM), a read only memory (ROM), a programmable read-only memory (PROM), a field programmable read-only memory (FPROM), or other dynamic storage device for storing information and instructions to be used by user info processing module 110 or search module 120. Data storage module 130 may also include a database, one or more computer files in a directory structure, or any other appropriate data storage mechanism such as a memory.

Figure 2:
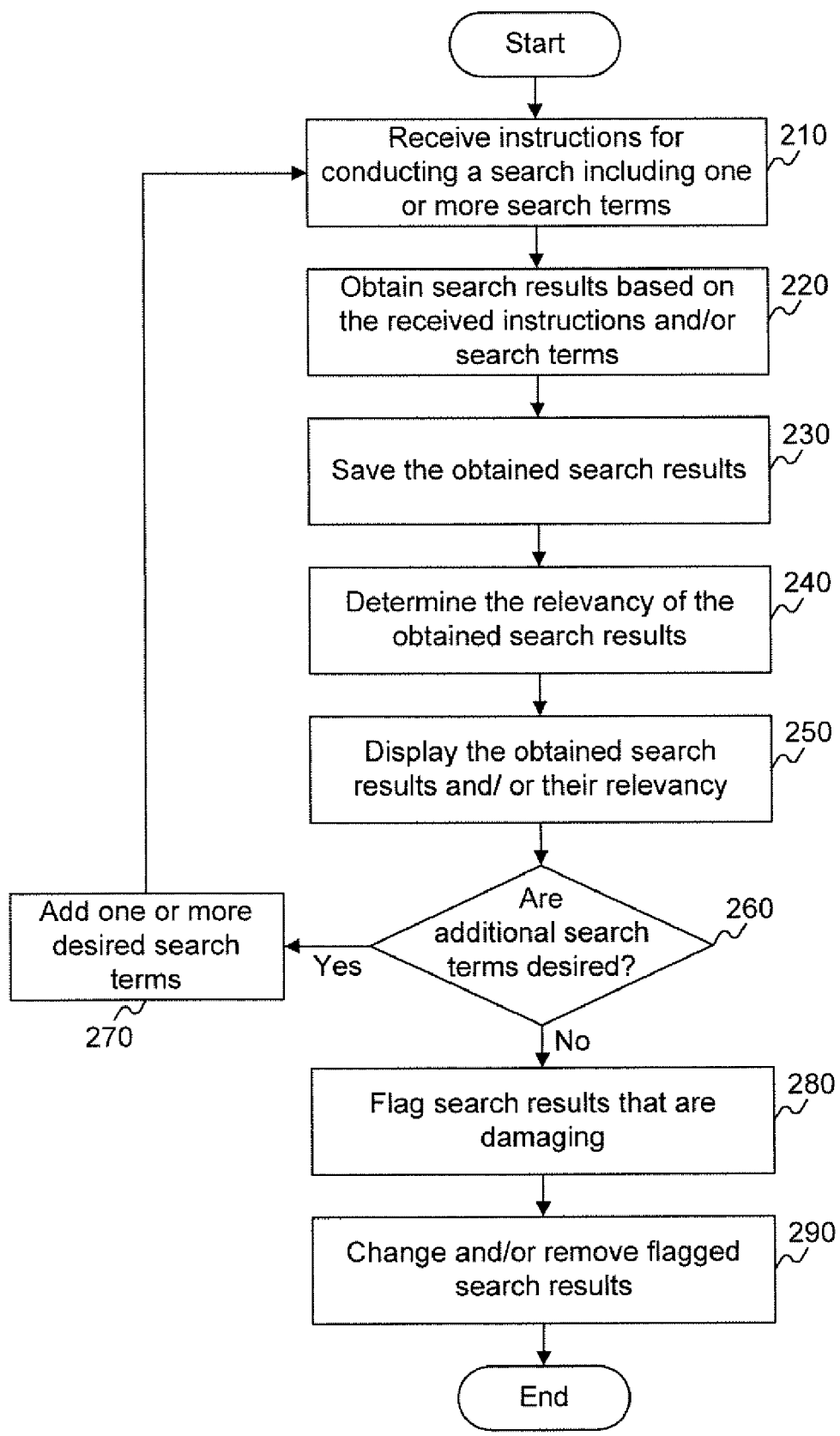
FIG. 2 is a flowchart depicting a process changing and/or removing a damaging search result from data sources.

FIG. 2 is a flowchart depicting a process for finding and changing and/or removing a damaging search result about at least one user from a data source. In step 210, instructions for conducting a search including at least one search term are received by, for example, a system or apparatus. The instructions may be received from, for example, a user directly, a third party, or an online data searching service that a user or third party may sign up for. The instructions may also be received from storage.

A user or third party may sign up for an online data searching service via, for example, a personal computer, a personal data device, or via a website. When signing up, a user or third party may provide identifying information about themselves or another which may be used by, for example, an information processing module, or a search module to construct searches related to the user or another. In some embodiments, the received instruction and/or at least one search term may be related to, for example, a user, a group, an organization, or a company.

In step 220, a search module may obtain at least one search result based on the received instructions and/or at least one search term. The search result may be obtained from a data source. A search result may be obtained via "screen scraping" on a publicly available search engine, such as Google™ search or Yahoo!™ search, or private search engines, such as Westlaw™ search or LexisNexis™ search. A search result may also be obtained via a searching application program interface (API) or a structured data exchange (such as eXtensible Markup Language). A search may be performed using at least one search term that is provided or is generated based on information provided by, for example, a user or a third party. In an exemplary search, a user may provide search terms such as her home town, city of residence, and alma mater which may be used alone or in conjunction with each other as search terms for a search. A search result may be obtained automatically or manually by a user, a third party, or a human agent based on the instructions and/or at least one search term. A search result obtained in step 220 may be saved (step 230).

Once a search result is obtained, the relevancy of the search result maybe determined, as in step 240. The relevancy may be determined, for example, automatically based on the number of times that certain types of data or elements of a search result are present in the search result. The relevancy of a search result may be based on, for example, the data source from which it was obtained, the content of the search result, or the type of search result found. Additionally or alternatively, the relevancy of a search result may be determined directly by, for example, a human agent or a user.

The relevancy of an obtained search result may include determining the mood and/or significance of the search result. The mood of a search result may include data regarding the content of the search result and may relate to, for example, the emotional context of the search result or its data source or the nature of statements within the search result. The determination and/or assignment of a mood to a search result may be based upon its positive or negative effect on a reputation. Different portions of a search result may have different moods based on, for example, their content. Moods and sub-moods may be assigned a numerical value. Calculating the impact of a search result's mood or sub-mood on a reputation is discussed in further detail below.

Additionally or alternatively, the relevancy of an obtained search result may include determining and/or assigning a significance to a search result or a data source. A significance may range, for example, from high to low. The significance of a search result or a data source may be assigned a weighted value such that more a important search result or data source is determined to have and/or assigned a greater significance when compared with less a important search result or data source. A search result or data source may be determined and/or assigned for example a high, medium, or low significance. The significance of a data source may be determined or assigned based on, for example, the number of inbound links to the data source, the number of search engines that report inbound links to the data source, or a synthetic measure that is proportional to the number of inbound links to the data source. Exemplary high significance data sources include MyFace.com™, iTunes™, or NYtimes.com™.

The significance of a search result may be determined and/or assigned based on, for example, the ratio of references to the search user's name to the total number of words in a search result, the existence of the user's name in the title of the search result, font design or graphic elements surrounding the user's name, or the rank of a user's name in a name query of a data source. A data source may be assigned a significance based on, for example, how frequently it is visited, or well known data source. Exemplary high significance search results may include the name of a user prominently or repeatedly mentioned on a data source. Calculating the impact of a search result's mood or sub-mood on a reputation is discussed in further detail below.

Figure 3:
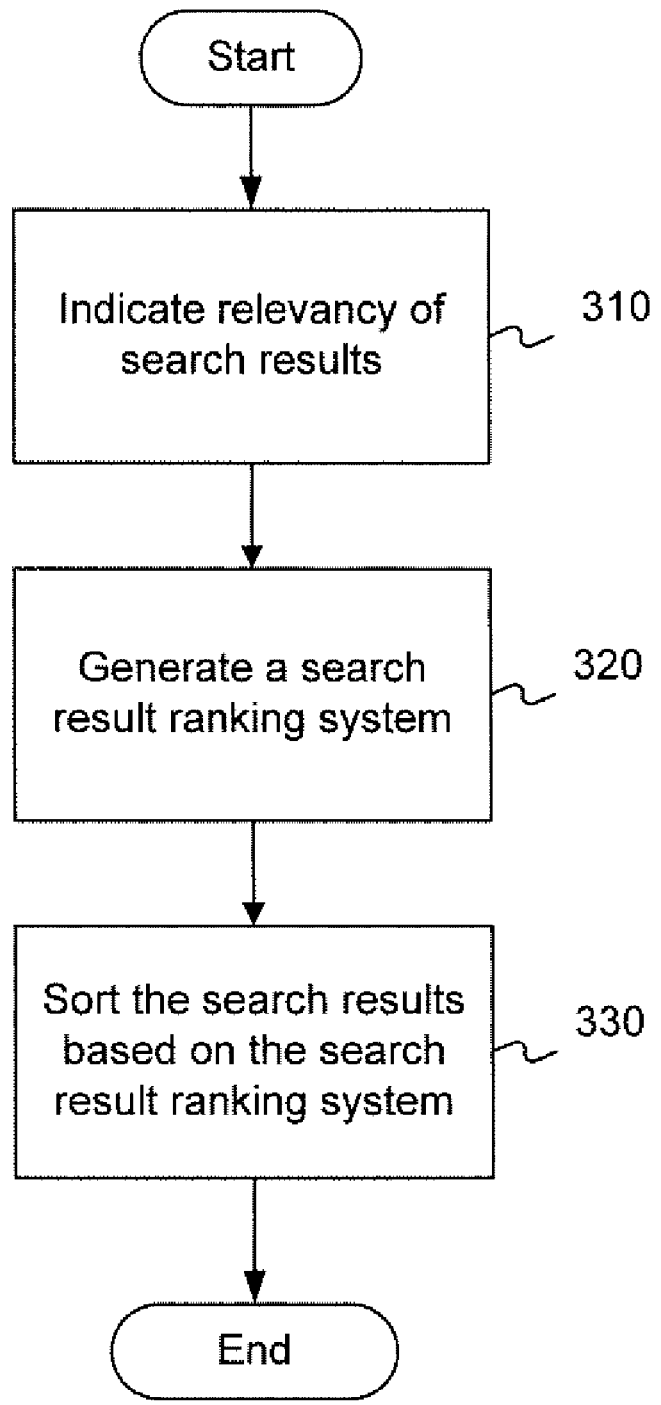
FIG. 3 is a flowchart depicting a process for sorting search results.

In some embodiments, step 240 may include generating a search result ranking system, and/or sorting search results based on the search result ranking system, examples of which are depicted in FIG. 3. In step 250, the search result may be output or displayed to, for example, a user, a human agent, or a software program. The relevancy of the search result may also be output or displayed to, for example, a user, human agent, or software program. The search result and/or its relevancy may be output or displayed via email, fax, webpage, or in any other appropriate manner. The search result and/or its relevancy may be displayed as, for example, a copy of the original search result, a link to the search result, a screen shot of the search result, or any other appropriate representation.

In step 260, an additional search term may be desired for a search. If an additional search term is desired for a search, then the additional search term may be used to obtain an additional search result (step 270). For example, if a search on a user's name elucidates the city in which the user works, then the city name may be added to the search terms for at least one future search. As an additional example, if a new nickname or username for a user is discovered, then it may be used as an additional search term for a search. Further, a determination may be made as to whether a search result is related to the same user. If the search result is related to the same user, then a search term may be added as described above. If a search result is related to a different user or otherwise not related to the user, then an exclusionary search term may be added to the search terms for a search. For example, if a user is named George Washington, then it may be appropriate to add exclusionary terms as part of step 270 to ensure that search results are not returned related to "George Washington University," "President George Washington," or "George Washington Carver."

An additional search term for a search may be determined by any appropriate method. For example, a search result may be presented to a user and the user may select an additional search term. Alternatively, a human agent may review a search result and provide additional search terms. Additional search terms may also be determined automatically by, for example, a search module, a user information processing module, or a human agent. The automatic determination of an additional search term may be based on any appropriate calculation or analysis. For example, if a particular search term occurred often in prior searches relevant to a user, then the particular search term may be used as an additional search term for a new search.

In step 280, a damaging search result may be flagged. The flagging of a search result may be implemented electronically by, for example, a user, a human agent, or a computer software program via, for example, a web interface, an email, mail, or fax to a human agent. A search result may be flagged by placing an appropriate flag in, for example, a data storage module or otherwise indicating that the search result is to be removed or changed.

In step 290, a flagged search result may be removed and/or changed, as appropriate. A user may request that all information about her, in the search result, be flagged and changed and/or removed or that only specific information within the search result changed or removed. The removal or change of a flagged result may be accomplished via an API for a relevant data source. For example, a structured data source may have an API that allows changing or removing data from the data source. A search module or other appropriate module may use a data source's API to indicate to the data source that information for a user is to be removed or changed. Flagged results may also be removed or changed when a user and/or human agent calls, emails, mails, or otherwise contacts human agents responsible for changing or removing information from the data source. In some cases, step 290 may include a human agent, such as a lawyer, drafting a letter on behalf of a user to persuade human agents responsible for the data source to change or remove data related to the user. In other cases, step 290 may include initiating civil or criminal lawsuits against a human agent or company responsible for a data source so that the judiciary may force a human agent or company responsible for the data source to change or remove the data related to a user.

In some embodiments, steps 220-270 may be performed at regular, irregular, or random intervals. For example, steps 220-270 may be performed hourly, daily, or at any appropriate interval. Steps 220-270 may be performed more often for some users than others based on user characteristics such as the likelihood of updates, time zone of residence, user preference, etc. Further, steps 220-270 may be performed more often for some data sources than others. For example, if it is known that a social networking site is updated more often than a company website, steps 220-270 may be performed more often for the social networking site than the company website.

FIG. 3 is a flowchart depicting a process for sorting search results. In step 310, the relevancy of an obtained search result is determined and/or indicated—either automatically or through human intervention as discussed above. In step 320, a search result ranking system may be generated. The search result ranking system may rank search results based on one or more considerations, such as their relevancy, mood, or significance, the age of the results, how damaging, beneficial, or harmless the results are to a user, or any other appropriate ranking means. In step 330, the search results may be sorted based on their ranking in the search result ranking system. The order in which the search results are sorted may define how search results are displayed. For example, search results may be sorted such that the newest and/or most damaging search result is displayed first, followed by the next newest, and/or most damaging search result.

In some embodiments, steps 320 and 330 may be performed using a neural network, a Bayesian classifier, or any other appropriate means for generating a search ranking system. If a Bayesian classifier is used, it may be built using, for example, human agent and/or user input. In some embodiments, the human agent and/or a user may indicate a search result as either "relevant" or "irrelevant." Each time a search result is flagged as "relevant" or "irrelevant," tokens from that search result may be added into an appropriate corpus of data, for example, a "relevance-indicating result corpus" or an "irrelevance-indicating result corpus." Before collecting data for a search, a Bayesian network may be seeded, for example, with terms collected from a user (such as home town, occupation, gender, etc.), or another source. After classifying a search result as relevance-indicating or irrelevance-indicating, the tokens (e.g. words or phrases) in the search result may be added to the corresponding corpus. In some embodiments, only a portion of the search result may be added to the corresponding corpus. For example, common words or tokens, such as "a", "the," and "and" may not be added to the corpus.

As part of maintaining the Bayesian classifier, a hash table of tokens may be generated based on the number of occurrences of a token in a corpus. Additionally, a "conditionalProb" hash table may also be generated for a token in either or both of the corpora to indicate the conditional probability that a search result containing that token is relevance-indicating or irrelevance-indicating. The conditional probability that a search result is relevant or irrelevant may be determined based on any appropriate calculations which may, in turn, be based on the number of occurrences of the token in the relevance-indicating and irrelevance-indicating corpora. For example, the conditional probability that a token is irrelevant to a user may be defined by the equation:

$$\text{prob}=\max(\text{MIN\_RELEVANT\_PROB},$$

$$\min(\text{MAX\_IRRELEVANT\_PROB}, \text{irrelevatProb/total})),$$

where:

MIN_RELEVANT_PROB=0.01 (a lower threshold on relevance probability),
MAX_IRRELEVANT_PROB=0.99 (an upper threshold on relevance probability),
Let r=RELEVANT_BIAS*(the number of time the token appeared in the "relevance-indicating" corpus),
Let i=IRRELEVANT_BIAS*(the number of time the token appeared in the "irrelevance-indicating" corpus),
RELEVANT_BIAS=2.0,
IRRELEVANT_BIAS=1.0 (In some embodiments, "relevance-indicating" terms should be biased more highly than "irrelevance-indicating" terms in order to bias toward false positives and away from false negatives, which is why relevant bias may be higher than irrelevant bias),
nrel=total number of entries in the relevance-indicating corpus,
nirrel=total number of entries in the irrelevance-indicating corpus,
relevantProb=min(1.0, r/nrel),
irrelevantProb=min(1.0, i/nirrel), and
total=relevantProb+irrelevantProb.

In some embodiments, if the relevance-indicating and irrelevance-indicating corpora are seeded and a particular token is given a default conditional probability of irrelevance, then the conditional probability calculated as above may be averaged with a default value. For example, if a user specified that he went to college at Harvard, the token "Harvard" may be indicated as a relevance-indicating seed and the conditional probability stored for the token Harvard may be 0.01 (only a 1% chance of irrelevance). In that case, the conditional probability calculated as above may be averaged with the default value of 0.01.

In some embodiments, if there is less than a certain threshold of entries for a particular token in either corpora or in the two corpora combined, then conditional probability that the token is irrelevance-indicating may not be calculated. When the relevancy of a search result is indicated the conditional probabilities that tokens are irrelevance-indicating may be updated based on the newly indicated search results as part, for example, of step 320.

When a new search result is obtained, the contents of the search result may be broken down into at least one token. The probability that a token is relevance-indicating and/or irrelevance-indicating may then be determined based on, for example, a ranking system. The highest probabilities of relevance-indication and/or irrelevance-indication among the token(s) may then be used to calculate a Bayesian probability. For example, if the highest N probabilities were placed in an array called "probs" then the Bayesian combined probability may be calculated based on the Naive Bayes Classifier rule as follows:

$$\frac{\prod_{i=1}^{N} probs(i)}{\prod_{i=1}^{N} probs(i) + \prod_{i=1}^{N} (1 - probs(i))}.$$

The search results may be sorted by the probability that each search result is relevant and/or irrelevant.

The Bayesian probability calculated above may represent the probability that the search result is "relevant" and/or "irrelevant." This is just one formulation of the repeated application of the Bayes Theorem. Other formulations may also be used to calculate a conditional probability based on unconditional probabilities, such as one or more formulations described at, for example, Papoulis, A. "Bayes' Theorem in Statistics" and "Bayes' Theorem in Statistics (Reexamined)," §3-5 and 4-4 in *Probability, Random Variables, and Stochastic Processes*, (2nd ed. New York: McGraw-Hill, pp. 38-39, 78-81, and 112-114, 1984, hereinafter "(Papoulis 1984)"). Exemplary alternate forms of Bayes' Theorem, described at (Papoulis 1984) at pp. 38-39, may also be used to calculate the probability that a search result is "relevant" and/or "irrelevant." A similar process may be used to associate and/or determine the mood and/or significance of a search result or data source.

Figure 4:
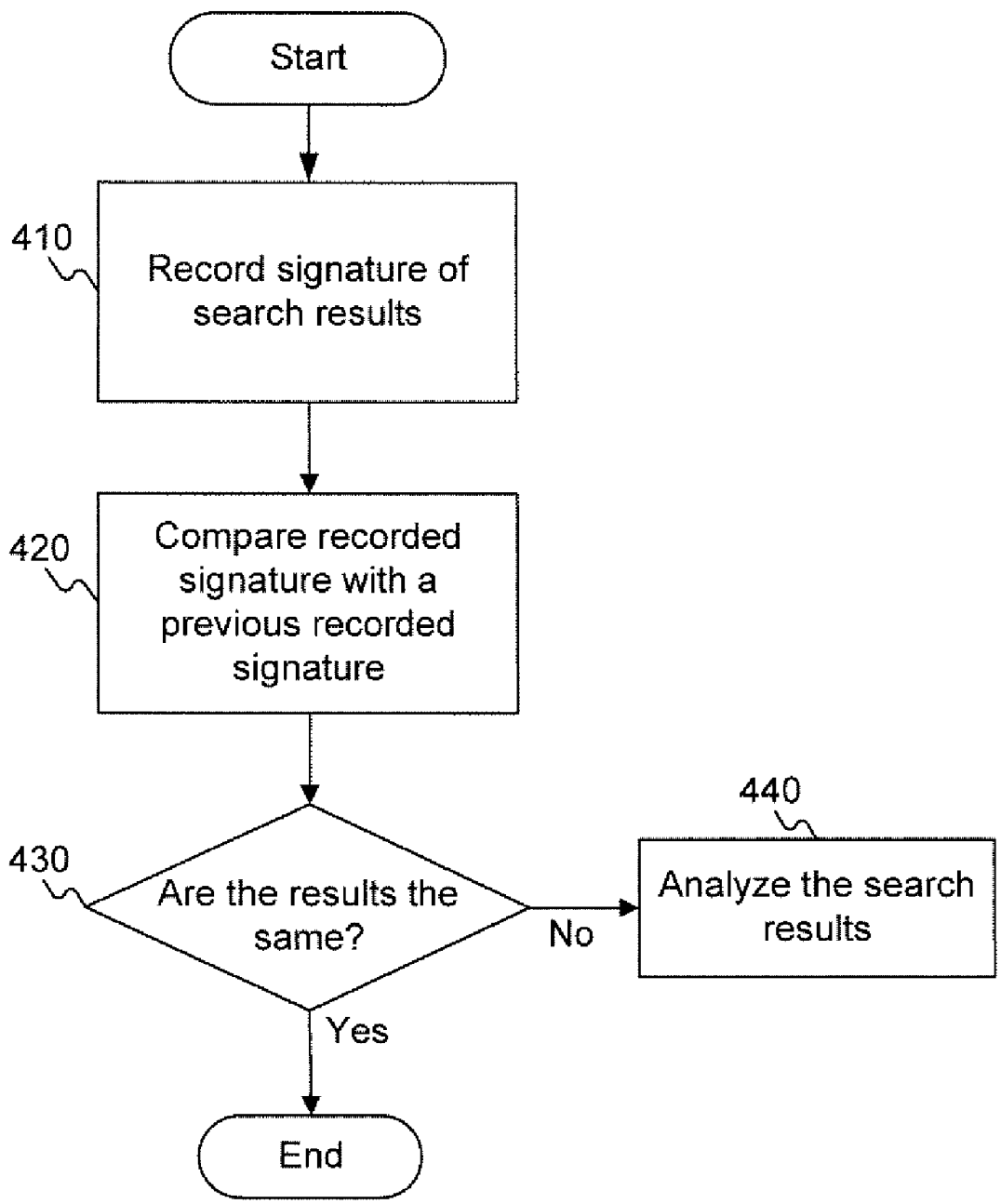
FIG. 4 is a flowchart depicting of a process for determining if the signature recorded for a search result is the same as a previously recorded signature for a search result.

FIG. 4 is a flowchart depicting a process for determining whether a signature recorded for a current search result is the same as a previously recorded signature. A signature of a search result may be, for example, a hash of the relevant web page, an abbreviated form of a search result or information from the search result, a hash of the search result or other computation based on the contents of the search. For example, the hash may be based on the complete search result or a portion of the search result, such as a portion of the search result surrounding at least one search term. A search result may include, for example, a website or web page within the website. A signature recorded for a search result may include information identifying the search result, such as a universal resource locator (URL) for the search result, or a classification of the type of search result, and/or a signature of a web site. The signature of a search result may then, in step 420, be compared with a previously-obtained signature of a previously-obtained search result.

In step 430, it may be determined whether the signature of a current search result is the same as the signature of a previously-obtained search result. If the current search result is the same as the previously-obtained search result, the current search result may not be analyzed further and the process depicted in FIG. 4 may end. If the signatures of the current and previously-obtained search results differ, the contents of the current search result may be analyzed further (step 440). For example, if a social networking site contains information about a user and the site is searched on a daily basis on behalf of a user, then a signature (such as a hash of the relevant web page) of the most recently-obtained search result may be compared to the signature of a previously-obtained search result. If the two signatures are identical, then the contents of the search results have not changed and there may be no need to further analyze the most recently obtained search results, at least until the source is next searched.

Figure 5:
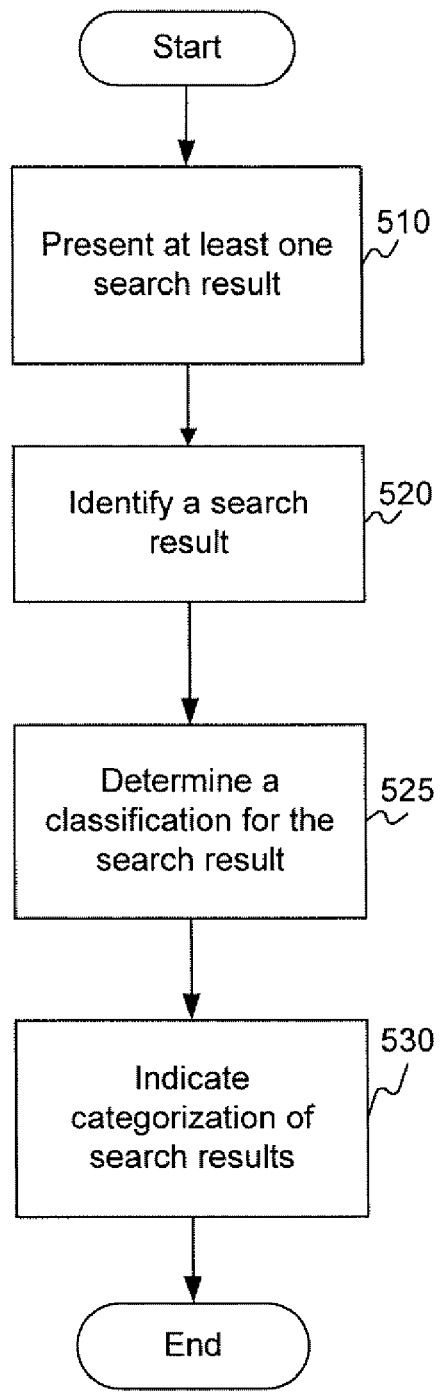
FIG. 5 is a flowchart depicting a process for indicating the categorization of the search results.

FIG. 5 is a flowchart depicting a process for indicating the categorization of search results. In step 510, a search result may be presented to, for example, a user and/or human agent via, for example, a web interface, a graphical user interface of a computer program, or via any other appropriate means. The displayed search result may be obtained via any appropriate means. For example, when a search is performed via one or more public search engines (e.g., Google™ or Yahoo!™), private search systems (e.g., LexisNexis™ or Westlaw™), or any data source, the result of the search may be displayed to, for example, the user and/or human agent.

In step 520, a search result may be identified by, for example, a human agent or user. In step 525, a classification for the search result may be determined. The classification may be determined by, for example, a human agent, a user, or a Bayesian classifier. Exemplary classifications include: relevancy to the user, how damaging the results are to the user, or the source type of the search results (social networking site, news database, etc). A search result may be classified based on, for example, the judgment of a human agent or a user, standard rules (e.g., any page referring to the user that contains an expletive may be flagged as damaging), or rules specific to the user (e.g., a user may request that all references to her and her previous job be flagged as damaging).

In step 530, the categorization of the search result may be indicated to an appropriate system or module. For example, if a human agent is using a web browser to search for information about a user and determines that a search result should be classified as damaging, then the human agent might use her computer mouse to "click on" a "bookmarklet" to indicate that the search result may be damaging. Classification may be indicated via, for example, "bookmarklets," programmable buttons, user interface elements, or any other appropriate means. A bookmarklet or programmable button may be a computer program running, at least in part, as part of a web browser or may be a computer program coupled to a web browser. A bookmarklet is a graphical button that, when clicked on, may cause a script or program to execute which may send a user information processing module, a server module, or any other appropriate module an indication that a search result is to be flagged. A user interface element, when selected, may cause actions to be performed which may indicate that a viewed search result is to be flagged. The search result and the flag or flags associated with it may be stored in a data storage module. The indicated flag may be used, in part, to determine the relevancy of a search result or may be shown when the search results are displayed.

Figure 6:
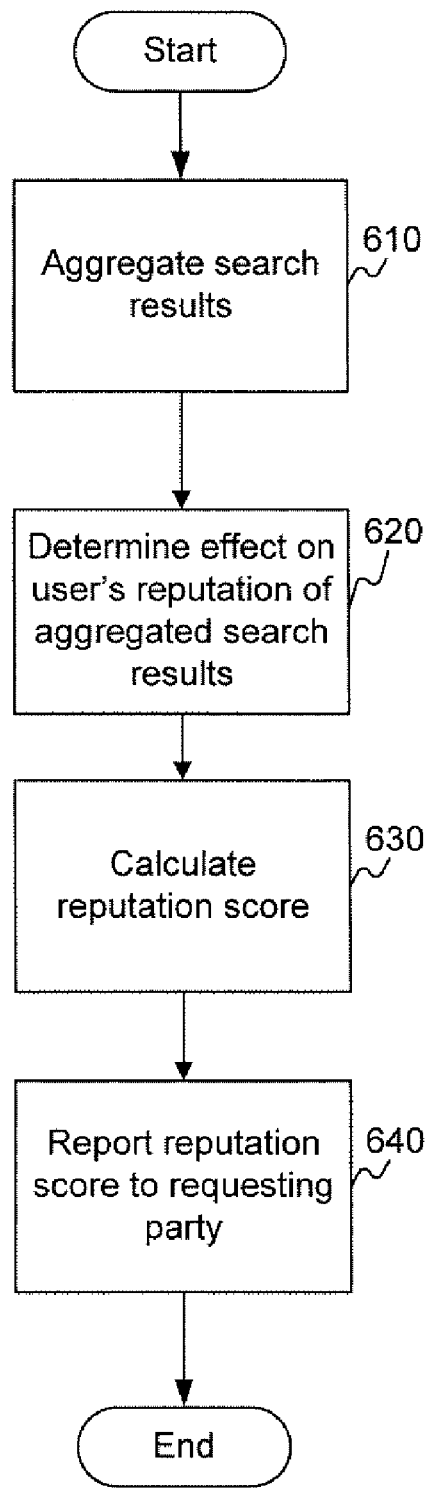
FIG. 6 is a flowchart depicting a process for calculating a reputation score for a user.

FIG. 6 is a flowchart depicting a process for calculating a reputation score. A reputation score may represent, for example, a user's reputation generally, or as an employee, employer, significant other, potential parent, or any other appropriate dimension or consideration. Further, a reputation score may comprise one or more reputation sub-scores that may be based on sub-elements of a user's reputation, such as specific domains of knowledge or types of interactions. For example, a reputation score for a person generally may comprise sub-scores for their reputation as an individual, business associate, employee, employer, significant other, lawyer, or potential parent. A reputation score may be based on other scores and information such as a credit score, an eBay seller score, or karma on a website like Slashdot™, or any other appropriate building block.

The steps in FIG. 6 may be performed to determine a single reputation score, multiple types of reputation scores, or one or more reputation sub-scores, any of which may be combined to calculate an aggregated reputation score. Reputational scoring is a means, for example, it effect on the reputation score of the user reducing search results regarding, for example, a user, to a simple summary score, grade, or any other appropriate measure. Reputation scoring may allow, for example, a user or human agent to focus on major online impact items that may affect a reputation score. A reputation score also allows, for example, a user or human agent to track relevant changes to data, a signature of a search result, and/or a search result.

In step 610, search results are aggregated. The aggregated search results may be any data related to, for example, a user or third party, from any data source. The aggregated search results may be data that is obtained via for example, the processes of FIGS. 2, 3, 4, and/or 5. Aggregated search results may also be data collected via other means or may be submitted directly by, for example, a user or human agent.

In step 620, aggregated search results are analyzed to determine their effect on a reputation. This determination may be manual or automatic. For example, a human agent or user may flag a search result, or a segment of the search result, from the aggregated search results as damaging or benefiting certain aspects of a user's reputation. A human agent or user may then indicate along one or more spectrums how the search result affects a reputation score.

Determining the effect of aggregated search results on a reputation score may be performed by analyzing a search result and indicating based on, for example, the content, mood or significance of the search result. In some cases, this determination and/or its indication is automatic. For example, if a user's reputation as an employer was being determined and the aggregated search results include postings discussing the user on a website designated as a place for posting information about "bad bosses," then an indication may be automatically generated to indicate that the web posting may be damaging to the user's reputation as an employer.

In some embodiments, a system may determine whether a search result positively or negatively affects the reputation of a user by determining whether any of the tokens surrounding the relevancy indicating tokens are contextually "positive" or contextually "negative." The set of surrounding tokens may be defined as the set of tokens within N of the relevance-indicating token, where N is any positive integer. In some embodiments, the set of surrounding tokens may be defined as all of the tokens in a search result or may be defined in any other appropriate manner. The system may determine whether the surrounding tokens are contextually-positive by looking them up in tables or databases of contextually-positive tokens. A parallel procedure may be used to identify contextually-negative tokens. For example, search results that reference the user and contain an expletive within N tokens of a relevancy-indicating token may be automatically categorized as damaging to the user's reputation score.

Furthermore, a reputation score may be calculated partially based on any contextually-positive, contextually-negative and/or mood indicating tokens found in the set of tokens surrounding a relevancy-indicating token. Contextually-negative or bad mood tokens may adversely affect or otherwise numerically lower the user's reputation score. While contextually-positive or good mood tokens may numerically increase or otherwise improve a reputation score. In some embodiments, contextually-positive and/or contextually-negative tokens may have numerical weights or multipliers associated with them. Likewise, numerical weights or multipliers may be associated with a token based on their relevancy and/or significance. The more heavily weighted tokens may have a greater effect on the user's reputation score. Some positive and negative context determinations may also be user-specific. For example, a posting on a website discussing a party that mentions a user may be more damaging to the reputation score for a minister than for a college student. Step 620 may also include automatic determinations and/or determinations by one or more users or human agents regarding the effect of search results on a reputation score.

In step 630, a reputation score may be calculated. A reputation score may be based on any appropriate calculation. For example, a reputation score may be a sum of the number of positive references minus the sum of the number of negative references in the aggregated search results. A reputation score may also be a weighted sum or average of the aggregated search results' effect on the reputation of a user. Additionally or alternatively, a reputation score may also be a sum or a weighted average of reputation sub-scores, which may be calculated as described above.

Once a reputation score has been calculated, it may be reported to the requesting party, as in step 640. For example, if a potential employee wanted to know the reputation of an employer, then the potential employee may request a report of the reputation score of the employer. The reputation score may also be reported to a user.

In some embodiments, the reputation score may be reported to a third party at the request of a user and the party calculating and presenting the reputation score per one of the embodiments herein may be "vouching" for the user when presenting the user's reputation score. For example, if a user were attempting to become a roommate of another person and the user's reputation score were reported to the other person by a reputation reporting company, then the reputation reporting company would be vouching that the user was as reputable as the user reputation score indicates.

The steps depicted in the exemplary flowcharts of FIGS. 2, 3, 4, 5, and 6 may be performed by user information processing module 110, by search module 120, or by any other appropriate module, device, apparatus, or system. Further, some of the steps may be performed by one module, device, apparatus, or system and other steps may be performed by one or more other modules, devices, apparatuses, or systems. Additionally, in some embodiments, the steps of FIGS. 2, 3, 4, 5, and 6 may be performed in a different order and/or with fewer or more steps than depicted in the FIGS. or descriptions herein.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for analyzing information about a user comprising the steps of:
    obtaining, at a computer, at least one search result from a data source via a search engine based on at least one search term identifying the user;
    identifying a contextual token or a mood-indicating token describing the user within a set of tokens surrounding a relevancy-indicating token in the at least one search result;
    ascertaining an effect of the at least one search result on a reputation of the user based on whether the identified contextual or mood-indicating token positively or negatively affects the reputation of the user;
    determining whether the at least one search result includes undesirable information negatively affecting the reputation of the user based on the ascertained effect of the at least one search result on the reputation of the user;
    flagging the at least one search result if it is determined that the at least one search result includes undesirable information;
    communicating with the data source to determine whether the undesirable information included in the flagged search result can be changed at the data source; and
    if it is determined that the undesirable information can be changed at the data source, causing a change of the undesirable information at the data source.

2. The method of claim 1, further comprising the steps of:
    determining an additional search term based on the at least one search result; and
    using the additional search term in the obtaining step.

3. The method of claim 2, wherein determining the additional search term is performed automatically.

4. The method of claim 2, wherein determining the additional search term is performed by a human agent or the user.

5. The method of claim 1, wherein causing the data source to change the undesirable information comprises:
    causing the data source to remove the undesirable information.

6. The method of claim 1, wherein the flagged search result contains data about the user that is incorrect.

7. The method of claim 1, wherein the flagged search result contains data that is damaging to a reputation of the user.

8. The method of claim 1, further comprising:
    determining the relevancy of the at least one search result.

9. The method of claim 8, wherein determining the relevancy of the at least one search result comprises determining whether the at least one search result contains information associated with the user.

10. The method of claim 9, further comprising:
    ignoring the at least one search result if the at least one search result does not contain information associated with the user.

11. The method of claim 9, further comprising:
    determining an exclusionary search term when the at least one search result does not contain information associated with the user, wherein the exclusionary search term excludes a search result that does not contain information associated with the user; and
    obtaining at least one search result for the user using the exclusionary search term.

12. The method of claim 1, further comprising:
    obtaining at least one additional search result;
    generating a search ranking system based on the at least one search result or the at least one additional search result; and
    sorting the search results based on a search ranking system.

13. The method of claim 12, wherein a Bayesian network is used to generate the search ranking system.

14. The method of claim 13, wherein the Bayesian network utilizes a corpus of irrelevance-indicating tokens and a corpus of relevance-indicating tokens.

15. The method of claim 1, further comprising:
    determining a signature for the at least one search result;
    comparing the signature to a previously-obtained signature for a previously-obtained search result; and
    determining the relevancy of the at least one search result when the signature and the previously-obtained signature are different.

16. The method of claim 1, wherein the obtaining at least one search result step is performed periodically.

17. The method of claim 16, wherein periodicity of performing the obtaining step is based on a user characteristic.

18. The method of claim 16, wherein periodicity of performing the obtaining step is determined based on a data source characteristic.

19. The method of claim 1, further comprising:
    presenting the at least one search result to a human agent;
    obtaining an indication of a categorization of the at least one search result from the human agent; and
    automatically categorizing the at least one search result based on the indication from the human agent.

20. The method of claim 1, wherein obtaining the at least one search result comprises receiving at least one search result from a human agent, and the method further comprising:
    obtaining an indication of a categorization of the at least one search result from the human agent; and
    automatically categorizing the at least one search result based on the indication from the human agent.

21. The method of claim 1, further comprising:
    receiving an indication of the relevancy of the at least one search result from the user or a human agent.

22. The method of claim 1, wherein obtaining the at least one search result comprises receiving at least one search result automatically, and the method further comprising:

obtaining an indication of a categorization of the at least one search result automatically; and automatically categorizing the at least one search result based on the indication.

23. An apparatus for analyzing information about a user comprising:

at least one computing processor configured to:

obtain at least one search result from a data source via a search engine based on at least one search term identifying the user;

identify a contextual token or a mood-indicating token describing the user within a set of tokens surrounding a relevancy-indicating token in the at least one search result;

ascertain an effect of the at least one search result on a reputation of the user based on whether the identified contextual or mood-indicating token positively or negatively affects the reputation of the user;

determine whether the at least one search result includes undesirable information negatively affecting the reputation of the user based on the ascertained effect of the at least one search result on the reputation of the user;

flag the at least one search result if it is determined that the at least one search result includes undesirable information;

communicate with the data source to determine whether the undesirable information included in the flagged search result can be changed at the data source; and if it is determined that the undesirable information can be changed at the data source, cause a change of the undesirable information at the data source.

24. A non-transitory computer readable medium storing instructions that, when executed, cause a computer to perform a method for analyzing information about a user, the method comprising:

obtaining at least one search result from a data source via a search engine based on at least one search term identifying the user;

identifying a contextual token or a mood-indicating token describing the user within a set of tokens surrounding a relevancy-indicating token in the at least one search result;

ascertaining an effect of the at least one search result on a reputation of the user based on whether the identified contextual or mood-indicating token positively or negatively affects the reputation of the user;

determining whether the at least one search result includes undesirable information negatively affecting the reputation of the user based on the ascertained effect of the at least one search result on the reputation of the user;

flagging the at least one search result if it is determined that the at least one search result includes undesirable information;

communicating with the data source to determine whether the undesirable information included in the flagged search result can be changed at the data source; and if it is determined that the undesirable information can be changed at the data source, causing a change of the undesirable information at the data source.

\* \* \* \* \*